United States Patent
Marafi

(10) Patent No.: US 8,287,618 B2
(45) Date of Patent: Oct. 16, 2012

(54) METHOD OR PROCESS FOR RECOVERING MO, V, NI, CO AND AL FROM SPENT CATALYSTS USING ULTRASONIC ASSISTED LEACHING WITH EDTA

(75) Inventor: Meena Marafi, Kuwait (KW)

(73) Assignee: Kuwait Institute for Scientific Research, Safat (KW)

( * ) Notice: Subject to any disclaimer, the term of this patent is extended or adjusted under 35 U.S.C. 154(b) by 97 days.

(21) Appl. No.: 12/943,619

(22) Filed: Nov. 10, 2010

(65) Prior Publication Data

US 2012/0111150 A1 May 10, 2012

(51) Int. Cl.
C22B 7/00 (2006.01)
C22B 3/26 (2006.01)
C22B 23/00 (2006.01)
C22B 21/00 (2006.01)
C22B 34/34 (2006.01)
C22B 61/00 (2006.01)

(52) U.S. Cl. ............ 75/419; 75/430; 75/743; 205/590; 205/595

(58) Field of Classification Search .............. 75/743, 75/419, 430; 205/590, 595
See application file for complete search history.

(56) References Cited

U.S. PATENT DOCUMENTS

| | | | |
|---|---|---|---|
| 2,367,506 A | 1/1945 | Kissock | |
| 3,213,033 A * | 10/1965 | Hindin et al. | 502/28 |
| 3,567,433 A | 3/1971 | Gutnikov | |
| 3,773,890 A | 11/1973 | Fox et al. | |
| 4,031,031 A * | 6/1977 | Yamaguchi et al. | 502/322 |
| 4,075,277 A | 2/1978 | Castagna et al. | |
| 4,087,510 A | 5/1978 | Steenken | |
| 4,145,397 A | 3/1979 | Toida et al. | |
| 4,175,109 A | 11/1979 | Kim | |
| 4,182,747 A | 1/1980 | Gravey et al. | |
| 4,216,118 A | 8/1980 | Yoshida et al. | |
| 4,374,099 A | 2/1983 | Kim et al. | |
| 4,432,949 A | 2/1984 | Hubred et al. | |
| 4,434,141 A | 2/1984 | Hubred et al. | |
| 4,514,368 A | 4/1985 | Hubred | |
| 4,514,369 A | 4/1985 | Hubred et al. | |
| 4,567,284 A | 1/1986 | Monzyk et al. | |
| 4,677,085 A * | 6/1987 | Nevitt | 502/26 |
| 4,762,812 A | 8/1988 | Lopez et al. | |
| 4,882,131 A | 11/1989 | Powers et al. | |
| 4,954,466 A | 9/1990 | Weisenfeld | |
| 5,565,091 A | 10/1996 | Iino et al. | |
| 6,180,072 B1 | 1/2001 | Veal et al. | |
| 6,455,018 B1 | 9/2002 | Cuif | |
| 6,923,922 B2 | 8/2005 | Chen et al. | |
| 7,108,839 B2 | 9/2006 | Boricha et al. | |
| 7,473,406 B2 | 1/2009 | Jasra et al. | |
| 2007/0025899 A1 | 2/2007 | Marcantonio | |
| 2012/0051988 A1 * | 3/2012 | Marafi | 423/123 |

* cited by examiner

*Primary Examiner* — George Wyszomierski
*Assistant Examiner* — Tima M McGurthy Banks
(74) *Attorney, Agent, or Firm* — Lowe Hauptman Ham & Berner, LLP

(57) ABSTRACT

A process for the selective recovery of Mo, V, Ni, Co and Al from spent hydroprocessing catalysts includes the steps of treating the spent catalysts to recovery metals, support as well as chemicals. The process steps include deoiling, decoking, washing, dissolving, complexing agent treatment, acid treatment and solvent extraction. This process uses limited steps than conventional processes by the use of ultrasonic agitation for metal extraction and the presence of a chelating agent particularly Ethylene Diamine Tetra-Acetic Acid (EDTA). The process also discloses the compete recovery of the extracting agent EDTA with high purity for reuse.

16 Claims, 1 Drawing Sheet

A flow diagram of the present invention for the metal recovery process from spent hydroprocessing catalyst using EDTA.

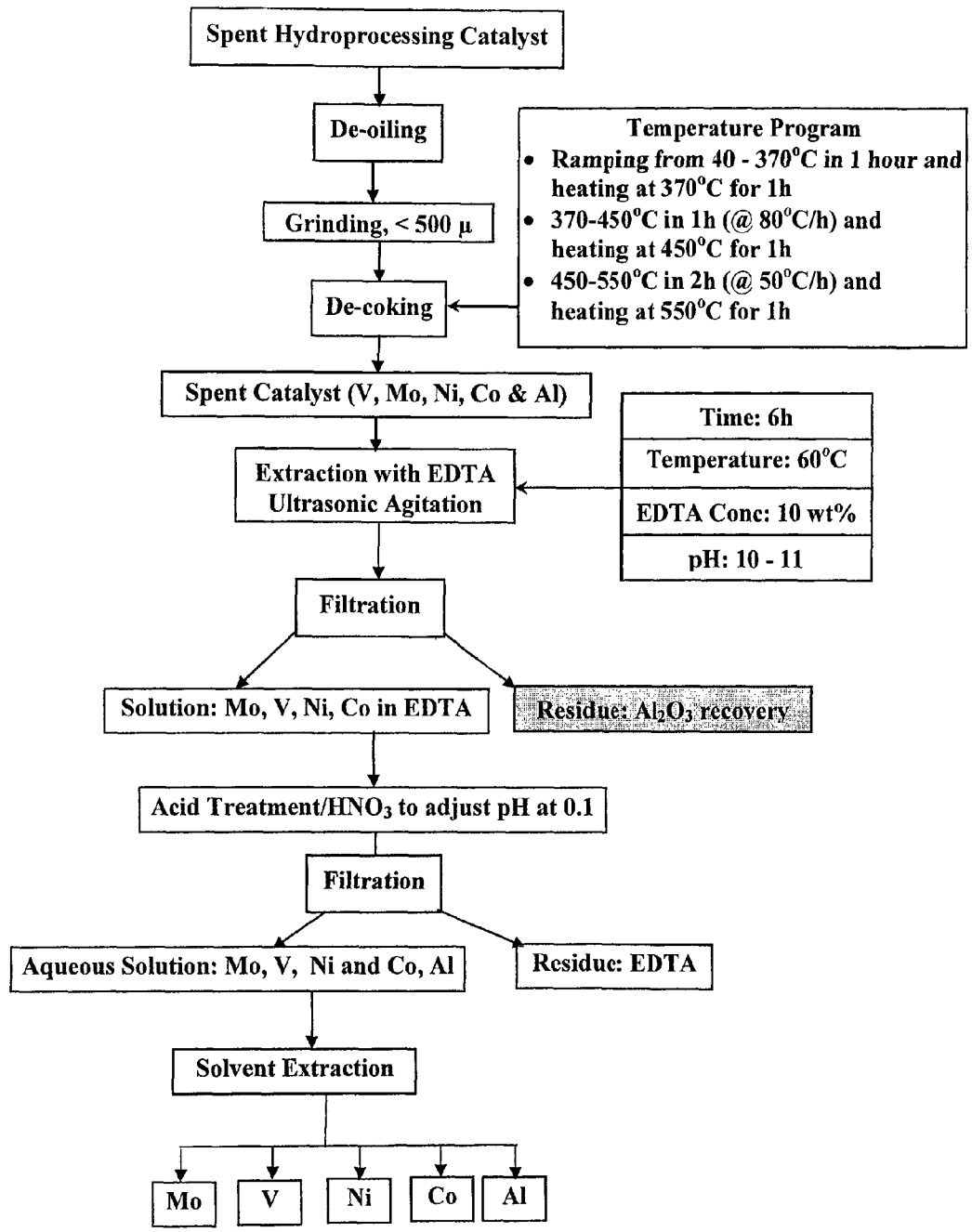
A flow diagram of the present invention for the metal recovery process from spent hydroprocessing catalyst using EDTA.

METHOD OR PROCESS FOR RECOVERING MO, V, NI, CO AND AL FROM SPENT CATALYSTS USING ULTRASONIC ASSISTED LEACHING WITH EDTA

FIELD OF THE INVENTION

This invention relates to a method for recovering molybdenum, vanadium, nickel, cobalt and aluminum from spent catalysts by ultrasonic agitation in the presence of a chelating agent particularly Ethylene Diamine Tetra Acetic Acid (EDTA) with essentially complete recovery of the EDTA.

BACKGROUND FOR THE INVENTION

The present invention is a process for recovery of metals present in a catalyst that had been used for upgrading of metal and sulfur containing feedstocks, (e.g., crude oils and residue) by hydroprocessing. Such upgrading is necessary to convert the heavy feedstock into more valuable, lower boiling fractions and to remove contaminants, particularly metals and sulfur, that can pollute the atmosphere upon combustion. Thus, the present invention relates to a catalytic process in which during the use of a reaction catalyst, the catalyst accumulates large amounts of metals that are present in the feedstock such as heavy, extra heavy and residue. The deactivated catalyst is usually discarded as a solid waste, which results in the loss of catalyst components (metal and support) but is also an environmental concern because of its hazardous nature. In the petroleum industry, particularly in hydroprocessing, an enormous amount of catalysts containing valuable metals such as Mo, W, Ni and Co are used. Such metals are deposited on the surface of the support or carrier composed of a porous, non-combustible inorganic material such as $Al_2O_3$, $TiO_2$, $ZrO_2$, $SiO_2$, MgO, ZnO or their mixed oxides with alumina.

Since the metals such as V and Ni present in the residual oil feedstock also deposit on the catalyst during the hydroprocessing operation, the used catalyst usually contains a variety of metals (i.e. Mo, V, Ni & Co) on the alumina or mixed oxide support. These metals are highly valuable and are used extensively in the steel industry and in the manufacture of special alloys. These metals are usually manufactured from the ores and minerals containing them. Spent hydroprocessing catalysts could be used as a cheap source for these valuable metals. This will result in recycling and reutilization of the waste catalysts and reduce their environmental problems. Therefore, a strong need exists to develop an economical process for complete recovery of these heavy metals from the waste catalysts.

Several methods such as chlorination, acid leaching, alkali leaching, bioleaching, roasting with sodium salts have been reported in the open literature and patents for the recovery of the metals from spent hydroprocessing catalysts exist. These methods have been reviewed by Marafi and Stanislaus in a recent paper "Resources, Conservation and Recycling 53 (2008)1-26". The acid or alkali leaching methods have many disadvantages because of the involvement of several steps, increased safety requirements and huge loss of chemicals at the end. On the other hand, the process developed in the present invention is easy and involves a relatively lower number of steps for the recovery of metals and $Al_2O_3$ support. Also the extracting reagent can be recovered with high purity for reuse.

A U.S. Pat. No. 3,773,890 of Fox et al. disclose a process for utilizing spent hydroprocessing catalysts for metal recovery where the catalysts were roasted with sodium chloride, which converts vanadium and molybdenum to a water soluble form. After water leaching, the vanadium and molybdenum solution is separated and the residue is treated with a sodium hydroxide in order to dissolve the alumina support. The aluminum containing solution is separated, leaving a residue which contains cobalt and nickel in a concentrated form.

U.S. Pat. No. 4,075,277 of Castagna et al. is directed to the recovery of high purity molybdic acid from catalyst materials. The catalyst is impregnated with an aqueous solution of sodium carbonate and heated to convert molybdenum compounds into sodium molybdate, while avoiding substantial conversion of alumina into a water soluble compound. Molybdenum is then separated from alumina, cobalt and nickel by using extraction with hot water.

U.S. Pat. No. 4,087,510 of Steenken describes the invention, where the recovery of vanadium and molybdenum is accomplished by mixing catalyst with solid alkali metal carbonate, heating to convert sulfur, vanadium and molybdenum into water soluble compounds, and extracting the soluble materials with water.

U.S. Pat. No. 4,145,397 of Toida et al. deals with an invention, wherein molybdenum, vanadium, cobalt and nickel are recovered. The spent catalyst was roasted, leached with a hot caustic alkali solution, which solubilizes most of the vanadium, molybdenum and some of the aluminum. Insoluble residues are treated with a hot acid solution to dissolve most of the cobalt and nickel, and traces of aluminum, and a remaining vanadium and molybdenum. In addition to requiring two types of leaching steps, the lack of specificity in leaching results in a highly complicated series of separations for each leached solution.

U.S. Pat. No. 2,367,506 of Kissock relates to recovery of the molybdenum present in spent hydroprocessing catalysts with a support of alumina. It describes a method which comprises immersing the pellets of spent catalyst in a solution of sodium carbonate until they are completely impregnated and then heating at high temperature in a rotary furnace. Under these conditions, the alumina is leaved substantially insoluble and the sodium aluminate formed may then be dissolved in water, entraining only a small quantity of aluminum in the form of sodium aluminate. The process has the disadvantage of reducing the solubility of the molybdate formed and, in fact, the dissolution thereof in water becomes difficult.

U.S. Pat. No. 3,567,433 of Gutnikov describes the invention, in which a hot ammonium carbonate solution is used to dissolve molybdenum, vanadium and nickel from spent hydroprocessing catalyst. Only molybdenum is substantially completely solubilized by the procedure while the rest of the metal remain un-extracted.

U.S. Pat. No. 4,762,812 of Lopez et al. discloses a process for selective recovery of Mo from an unsupported spent $MoS_2$ catalyst contaminated with Ni and V, by reducing the oxidized catalyst with a reducing agent such as hydrazine before extraction with ammonia. The spent catalyst was first oxidized to convert the metal sulfides to oxides and then treated with hydrazine to reduce the high valence state of vanadium to a lower valence state.

U.S. Pat. Nos. 4,374,099 of Kim et al., 4,175,109 of Kim and 4,882,131 of Powers et al. describes-the-recovery of tungsten metal from alkali tungstate solution by solvent extraction, comprises a stripping agent is aqueous ammonia and the aqueous phase is dispersed in the organic phase, which is called an organic continuous mode.

US Patent Publication 2007/0025899 of Marcantonio disclose a process for spent catalysts recovery that used an ammonia pressure leaching technique in the presence of oxygen to produce ammonium molybdate, ammonium metavanadate and nickel ammonium sulfate from an unsupported spent hydroprocessing catalyst that contained sulfides of Mo, V and Ni.

U.S. Pat. No. 4,216,118 of Yoshida et al. describes chlorinating spent hydroprocessing catalysts to convert vanadium values to vanadium tetrachloride and nickel values to nickel chloride for recovery by solvent extraction.

U.S. Pat. No. 4,434,141 of Hubred et al. describes recovering metal values from an aqueous stream. The metal values are preferably obtained by leaching spent hydroprocessing catalysts which include nickel, cobalt, vanadium and molybdenum. The metal values are extracted, isolated and purified by liquid extraction techniques.

U.S. Pat. No. 4,514,369 of Hubred et al. discloses leaching of spent hydroprocessing supported catalysts, to obtain liquor containing cobalt, nickel, molybdenum and vanadium. The metals are extracted, isolated and purified by liquid/liquid extraction techniques.

U.S. Pat. No. 4,432,949 of Hubred et al. discloses leaching metals from a catalytic support which had been previously roasted. Vanadium is removed by precipitation, and nickel, cobalt and molybdenum are then removed by serial ion exchange.

U.S. Pat. No. 6,180,072 Veal et al. reported a process that used a caustic leach to extract Mo and V in the first stage and aqueous ammonia/ammonium carbonate in the second stage to extract Ni from a catalyst that contained the metals (Mo, V and Ni) as sulfides. The caustic leach was conducted in two steps: first step at atmospheric pressure in the presence of caustic and air at a temperature less than 60° C. and a pH range of 10-13. About 50-70% of V and Mo sulfides were converted to soluble thiosulfate and sulfate species while Ni and Co were not reactive under these conditions. After filtration the solids from the atmospheric caustic leach were subjected to pressure leach with caustic at a higher oxygen pressure and at a higher temperature to solubilize the remaining V and Mo sulfides. About 97% of the Mo, 92% of the V and 98% of the sulfur were solubilized in the atmospheric and pressure leaching steps of caustic leaching. The soluble metals (V and Mo) were then separated by solid/liquid separation. However, this process requires long and complex methodology, which is usually not preferred by refiners.

U.S. Pat. No. 4,182,747 of Gravey et al. deals with the invention that provides a methodology to recovery of metals from waste catalyst materials by chlorination. The process comprises transforming the metals into volatile and non-volatile chlorides by carbo-chlorination and then separating the chlorides in a selective manner. The residual oil present in the spent catalyst was first removed by extraction with a solvent. After the hydrocarbon extraction, the waste catalyst containing metal sulfides, $Al_2O_3$ and coke was treated with gaseous chlorine at 600° C. V, Mo and Al were converted to volatile chlorides under these conditions.

U.S. Pat. No. 4,514,368 Hubred disclose a process for removing nickel, cobalt, molybdenum, and vanadium from spent hydroprocessing catalyst particles by roasting the catalyst at 600° C. and leaching the catalyst particles with an aqueous solution of ammonia and an ammonium salt. The particles are then leached with an aqueous solution containing ammonia and an ammonium salt. This process extracts at least 85% of Mo, 70% of the V, 70% of Ni and 45% of Co in a given time.

U.S. Pat. No. 4,954,466 of Weisenfeld deals with processes for recovering transition metals of Group VIII of the periodic chart, and more particularly, Co and Ni with complexing agents (N-acetyliminodiacetic acid, N-acylamino acids with aldehyde) by dissolving the complex in an aqueous solution of a strong acidic solution, extracting the acid solution with a hydrocarbon solvent containing a trialkylamine to transfer the metals from the aqueous solution into the hydrocarbon solvent.

U.S. Pat. No. 4,567,284 of Monzyk et al. discloses recovery of metals from spent catalyst by solvent-extraction in a hydrocarbon solvent that is used to extract the transition metals of Group VIII from an aqueous solution, separating the hydrocarbon solvent metal containing organic phase and recovering the organic phase. While N-alkylalkanohydroxamic acids are known as extractants, which is also known as chelating agents. The mode of action of hydroxamic chelating agents is to chelate the $Co^{+2}$ ions in order to form an organic soluble species. Such species can be stripped from the organic solution using aqueous ammonia. Unfortunately, when hydroxamic chelating agents are applied to the reaction product, it was found that N-acetyliminodiacetic acid competes effectively as a chelating agent with hydroxamic acid for cobalt ($Co^{+2}$ and thereby renders the use of hydroxamic acids unsatisfactory in recovering metals in the presence of N-acetyliminodiacetic acid.

U.S. Pat. No. 4,677,085 of Nevitt discloses a process for spent catalyst rejuvenation of hydrotreating catalyst that pertains to a process for removing deposited metals, especially contaminant metals (Ni and V) during the reaction from the feedstock. This invention also pertains to a process that provide several uses for the catalyst such as metal recovery, rejuvenation and redispersion of active sites. The process comprises: i) mixing the spent catalyst with a complexing agent (EDTA), and ii) separating the treated catalyst from the complexing agent and the removed metals (mainly Ni and V). By this process contaminant metals, like vanadium, are more selectively removed from the spent catalyst than are catalytic metals, like cobalt and molybdenum. However, this investigation just claims the vanadium and nickel removal because the aim of this investigation was to rejuvenate and re-disperse active components (Co, Mo) over the catalyst.

French Pat. No. 701,426 relates to a process for the treatment of catalysts used for the hydrogenation of coal, oils and tars. In addition to an alumina-based support, these catalysts contain metal compounds based on Mo, Cr, Zn and Mg. The inventor found that if these catalysts were roasted at a temperature below 500° C., it was possible to solubilize the Mo with a solution of ammonia which enables an ammonium molybdate to be obtained, the other metals remaining unaffected or only slightly affected. It is then possible to precipitate the molybdic acid with hydrochloric acid at boiling temperature. This process has the major disadvantage of a low reaction velocity between the ammonia and the molybdenum oxide contained in the catalyst. In addition, the extraction yield is low, a significant proportion of the molybdenum oxide being retained in the inert materials. Finally, the molybdenum sulfide is hardly affected by the ammonia.

The above patents are representative examples of state-of-the-art which disclose metal recovery methods, particularly for Mo, V, Ni and Co recoveries from spent catalysts. Most of the aforementioned patents use conventional methods such as leaching with strong acids or bases, roasting with sodium salts and subsequent extraction in several steps. These conventional methods have many disadvantages. They involve several operational steps which require high temperatures, large amount of chemicals and increased safety and environmental considerations. On the other hand the process of the present invention, which involves ultrasonic assisted low-temperature leaching of metals from the spent catalyst with a complexing agent such as EDTA, is less energy intensive and permits maximum recovery of the metals in easy less complicated steps. Furthermore, the EDTA reagent used for leaching of metals can be easily recovered and recycled.

The following patents disclose processes for recovering metals from spent catalyst by leaching with EDTA:

U.S. Pat. No. 5,565,091 of Iino et al. discloses a Catalyst composition manufacturing and recovery with molybdenum, tungsten, cobalt and nickel. Note column 8, lines 5-9, with EDTA, column 9, lines 21-34 and later desulfurization and recovery, column 12, lines 11-34.

U.S. Pat. No. 6,455,018 of Culf discloses the recover of precious metals such as platinum, rhodium, palladium, iridium and cerium along with gamma alumina. Note column 1, lines 53-65.

U.S. Pat. No. 6,923,922 of Chen et al. discloses a process for recovery of rhodium from spent catalyst. Note column 2, lines 21-27 and by leaching with EDTA, see column 5, lines 15-26.

U.S. Pat. No. 7,108,839 of Boricha et al. discloses a process for recovery of Pd, Pt and Rhodium from spent catalyst. See column 1, lines 21-31 and column 2, lines 11-17 for the disclosure of leaching with EDTA.

U.S. Pat. No. 7,473,406 of Jasra et al. discloses a process for recovery of palladium with 99% purity. Please note column 4, lines 20-23. The process uses a non-aqueous system that does not require EDTA, please note column 3, lines 23-32.

BRIEF SUMMARY OF THE INVENTION

Briefly the process for extraction of vanadium, molybdenum, nickel, colbalt and aluminum from spent hydroprocessing catalyst in accordance with the present invention includes the following steps:
  i.) washing the spent catalyst to remove residual oil;
  ii.) grinding the spent catalyst to provide fine particles of less than 500 microns;
  iii.) decoking the fine particles to remove carbonaceous deposits;
  iv.) mixing the decoked fine particles with Ethylene Diamine Tetra Acetic Acid (EDTA) solution and subjecting the fine particles in EDTA to ultrasonic agitation to thereby extract V, Mo, Ni, Co, and aluminum; and
  v.) recovery of EDTA by treating the ultrasonic agitated metals containing EDTA solution with acid.

In a preferred embodiment of the invention a method for the selective recovery of Mo, V, Ni, Co and Aluminum from spent hydroprocessing catalysts includes the steps of:
  a.) providing a mass of spent hydroprocessing catalysts containing up to 10% oil, 10 to 30 wt % coke or carbonaceous deposits, about 3 to 10 wt % Mo, about 2 to 6 wt % Ni, and about 3 to 20 wt % V and about 2 to 4 wt % Co and up to about 35 wt. % Al;
  b.) washing the spent catalyst to remove the residual oil and drying the spent catalysts at about 110-120° C. in air or nitrogen.
  c.) crushing and/or grinding the dried spent catalyst to a fine power;
  d.) mixing the fine powder with and Ethylene Diamine Tetra Acetic Acid (EDTA) and subjecting the fine powder in EDTA to ultrasonic vibration for a period of up to about 6 hours;
  e.) filtering and washing the fine powder and EDTA and separating the dissolved metals V, Ni, Mo, Co with traces of Al in solution and un-dissolved alumina remains as a residue;
  f.) treating the filtrate of the solution with $HNO_3$ to precipitate EDTA; and
  g.) solvent extraction of the aqueous solution to obtain Mo, V, Ni, Co and Al.

The invention will now be described in connection with the accompanying drawings wherein like reference numerals have been used to define like parts.

DESCRIPTION OF THE DRAWINGS

FIG. 1 is a flow diagram of the present invention for the metal recovery process from spent hydroprocessing catalysts using EDTA.

DESCRIPTION OF THE PREFERRED EMBODIMENTS OF THE INVENTION

An ultrasonic assisted leaching procedure was developed in the present invention for recovering metals (Mo, V, Ni, Co) present in spent hydroprocessing catalysts using a complexing agent such as EDTA for leaching. The influence of various parameters such as ultrasonic bath temperature, ultrasonic agitation time, EDTA concentration, etc. on the extent of extraction was studied and optimized. Under optimized conditions the recoveries of Mo, V and Ni were greater than 96%. The stepwise description of metals recovery from spent hydroprocessing catalyst is shown in FIG. 1. The overall process of the present invention comprised the following steps: i) de-oiling, ii) grinding, iii) de-coking, iv) dissolution in ultrasonic bath with EDTA, v) separation, and vi) acid treatment, to recover the used EDTA reagent with high purity from the extracted metals-containing solution, which is suitable for reuse in further extraction treatment in this process.

The spent catalyst used in this invention could be from petroleum heavy oils and residues hydrotreating and hydroprocessing operations that include desulphurization/conversion of atmospheric and vacuum residues in fixed bed and ebullated bed reactor units. The spent catalyst may contain oil, coke, and compounds of metals such as Mo, Ni, V and Co together with Al and some other elements such as S, P and Si. Generally, the spent catalyst may contain up to 10% oil, about 10 to 30 wt % coke or carbonaceous deposits, about 3 to 10 wt % Mo, about 2 to 6 wt % Ni, and about 3 to 20 wt % V. The spent catalyst can also contain about 2 to 4 wt % Co.

In step (i) the spent catalyst is washed with a suitable solvent such as naphtha or toluene to remove the residual oil and then dried by heating to 110 to 120° C. in air or nitrogen under suitable conditions. In step (ii), the oil-free spent catalyst obtained from step (i) is crushed and ground to fine powder and sieved to produce particle size <500 microns. Conventional grinding and sieving equipment (e.g. Ball mill sieve shaker, etc.) can be used for the grinding and sieving operations in step (ii). In step (iii), the oil free catalyst may be subjected to a decoking treatment under suitable conditions to remove the coke and sulfur deposits from the spent catalyst prior to the grinding step. Decoking is preferably carried out by heating in air or in a gas containing 2-10% $O_2$ in $N_2$ under programmed temperature conditions in the temperature range 370 to 550° C. After decoking, the spent catalyst powder is mixed with EDTA solution and subjected to ultrasonic agitation in an ultrasonic bath with variation of agitation time, temperature and EDTA solution concentration (step iv).

The spent catalyst decoking as described above, is carried under stepwise temperature ramping in various steps. For example, the process includes three steps carried out in an initial partial decoking step wherein the spent catalyst is contacted with the oxygen-containing gas (2-10% $O_2$ in nitrogen). In the first step temperature was linearly raised from 40° C. to 370° C. (330° C./h) and kept at this temperature for one hour. The second step temperature was then increased from 370° C. to 450° C. (80° C./h) and stayed for one hour. Then the final decoking step was ranging from 450° C. to 550° C. (50° C./h) for two hours and staying at 550° C. for one hour.

The Ultrasonic equipment used in this study was a BRAN-SONIC model: DTH-8510 (Digital control, plus Heat and Timer), which has a ultrasonic vibration frequency of 43 kHz.

The treated mixture is filtered and washed in which dissolved species (mainly metals V, Ni and Mo and aluminum in traces) can be separated as liquid solution while un-dissolved alumina remains as residue (step v). The filtrate of solution is treated with $HNO_3$ at pH 1.5 in order to precipitate EDTA while metals remain in the aqueous solution (step vi). The solution is further filtered to separate EDTA as residue and metals in solution (step vii). The metals (V, Mo and Ni) in solution can be separated by using conventional solvent extraction methods.

To separate the individual metals from the solution, a solvent extraction method was used from the acid-leached solution. The individual metals were removed as metal salts from the solvent phase by scrubbing and precipitating using suitable reagents. The extraction was carried out in the presence of Cyanex-272 in order to separate metals such as Mo, V, Ni and Al from the leached solution by solvent extraction at different pH levels.

Cyanex-272 reagent (20% Cyanex-272) in white spirit (i.e. odorless kerosene) was used for solvent extraction. The equilibrium pH of the aqueous phase was varied in the range 0 to 7 using sulfuric acid and sodium hydroxide. Solvent extraction tests were conducted batch wise by shaking equal volumes of the aqueous (25 ml) and organic phases (25 ml) in a series of 100 ml flasks immersed in a thermostated ultrasonic water bath maintained at 40° C. The aqueous and organic phases were then separated using a separating funnel and the concentrations of different metals (Mo, V, Ni and Al) in the aqueous phase were measured by using ICP-OES.

The ph of the aqueous solution is an important factor that influences the selectivity of extraction of different metals by solvent extraction. In the present invention, the pH of the aqueous solution containing Mo, V, Ni, and Al was varied in the range 0-7 and the selectivity for the extraction of each metal by the solvent (Cyanex-272) was examined.

Mo was extracted completely (100%) at pH 0. The amount of V extracted increased sharply with the increase of pH from 0 to 2 and reached a maximum of 99.9% at the pH range 2.1 to 2.5. Al extraction by the solvent started at pH 1 and remained less than 10% up to pH 2.5 and then increased drastically in the pH range of 2.5 to 3.3. The maximum amount of Al extracted at pH 3.3 was 97%. However, two successive extractions of the aqueous solution at pH 3.3 were needed to achieve such high levels of Al removal. Ni extraction overlapped slightly with Al extraction at pH 3.3. However, the amount of Ni co-extracted with Al at this low Ph was less than 6%. Increase of pH from 3.3 to 5.1 gradually increased the amount of Ni extracted from 5.8 to 26%. A further increase of pH above 5.1 resulted in a remarkable increase in Ni extraction to a maximum of 99.8% at pH 6.9.

The present invention is further illustrated in detail with the following examples which are not to be construed as limiting the invention.

EXAMPLE 1

A sample of spent catalyst from an industrial atmospheric residue hydrotreating unit was decoked, crushed, ground and sieved to particle size <500 microns and then decoked in accordance with the procedures described in steps (i) to (iii). The decoked spent catalyst contained 5.85 wt % Mo, 9.8 wt % V, 4.67 wt % Ni and 31 wt % Al. 2.5 g of the decoked spent catalyst was mixed with 100 ml of 10 wt % EDTA solution (pH=10.4) in a conical flask and agitated in a thermostatically controlled ultrasonic bath at 50° C. for 1 hour. The temperature of the bath was maintained at 50° C. throughout the leaching experiment. After 1 hour of agitation, the extracted solution was filtered from the residue. The concentration of Mo, V, Ni and Al in the extracted solution was analyzed by ICP-AES and the extraction percentages of these metals from the spent catalyst were calculated. Similar leaching experiments were carried out for different leaching durations of 1, 3, 4, 5 and 6 hours. The amounts of Mo, V, Ni and Al extracted in these experiments for 1 to 6 hour leaching durations are presented in Table 1.

TABLE 1

Effect of time variation on the extraction of metals from spent catalyst using EDTA and ultrasonic agitation (EDTA concentration: 10%; Solid to Liquid ratio: 1:40; temperature: 50° C.)

| Time | Metal recovery, wt. % | | | |
|---|---|---|---|---|
| hrs | Mo | Ni | V | Al |
| 1 | 90.5 | 73.9 | 65.5 | 8.7 |
| 2 | 93.9 | 81.5 | 73.7 | 10.4 |
| 4 | 96.2 | 88.2 | 82.3 | 12.0 |
| 6 | 97.0 | 95.1 | 93.9 | 14.4 |

EXAMPLE 2

Leaching experiments were carried out using 2.5 g decoked spent catalyst and 100 ml of 10% EDTA for 6 hrs in accordance with the procedure described in example 1 except that the temperature of leaching in the ultrasonic bath was changed to 35° C. and 60° C. instead of 50° C. The extraction percentages of Mo, V, Ni and Al at different temperatures (35, 50 and 60° C.) are compared in Table 2.

TABLE 2

Effect of temperature variation on the recovery of metals from spent catalyst using EDTA and ultrasonic agitation. (EDTA concentration: 10%; leaching time: 6 h; Solid to Liquid ratio: 1:40)

| | Metal recovery, wt. % | | | |
|---|---|---|---|---|
| Temperature ° C. | Mo | Ni | V | Al |
| 35 | 90.8 | 89.3 | 91.3 | 10.2 |
| 50 | 97.0 | 95.1 | 93.9 | 14.4 |
| 60 | 97.8 | 97.0 | 96.1 | 17.6 |

EXAMPLE 3

Leaching experiments were carried out at 60° C. for 6 hour duration using 2.5 g of decoked spent catalyst and 100 ml of EDTA solution in accordance with the procedure described in example 1 except that the concentration of the EDTA solution was varied in the range 2.5 to 10 wt %. The extraction percentages of Mo, V, Ni and Al at different concentrations of EDTA solution are presented in Table 3.

TABLE 3

Effect of EDTA concentration on the extraction of metals from
spent catalyst (Leaching time: 6 h;
Temperature: 60° C.; Solid to Liquid ratio is 1:40)

| Concentration of | Metal Recovery, wt % | | | |
|---|---|---|---|---|
| EDTA (wt %) | Mo | Ni | V | Al |
| 2.5 | 84.6 | 82.9 | 80.2 | 12.0 |
| 5.0 | 90.9 | 90.0 | 82.4 | 14.6 |
| 7.5 | 96.2 | 95.9 | 94.6 | 15.2 |
| 10.0 | 97.8 | 97.0 | 96.1 | 17.6 |

EXAMPLE 4

Leaching experiments were carried out at 60° C. for 6 hour duration in accordance with the procedure described in Example 1, except that the ratio between the solid (spent catalyst-weight) and the liquid (EDTA solution volume) was varied in the range 1:15 to 1:40. The extraction percentages of Mo, V, Ni and Al at different solid/liquid ratios are presented in Table 4.

TABLE 4

Effect of solid (catalyst)-Liquid (EDTA solution) ratio on
recovery of metals from spent catalyst
using EDTA and ultrasonic agitation at 60° C.
(EDTA concentration: 10%; leaching time: 6 h)

| | Metal Extracted (wt %) | | | |
|---|---|---|---|---|
| Solid/liquid ratio | Mo | Ni | V | Al |
| 1:15 | 88.7 | 85.7 | 87.0 | 13.6 |
| 1:20 | 91.8 | 90.1 | 88.6 | 14.9 |
| 1:30 | 94.5 | 93.9 | 91.8 | 16.1 |
| 1:40 | 97.8 | 97.0 | 96.1 | 17.6 |

The above examples clearly indicate that ultrasonic assisted leaching with EDTA reagent is very effective for the extraction of valuable metals from spent hydroprocessing catalysts at low temperatures. Leaching conditions such as leaching time, temperature, EDTA concentration and solid (spent catalyst) to liquid (EDTA solution) ratio have strong influence on the extent of extraction of different metals (Mo, Ni and V). Under optimum leaching conditions (leaching time=6 h; temperature=60° C.; EDTA concentration 10 wt %; solid/liquid ratio=1:40) grater than 96% of Mo, V and Ni can be extracted.

EXAMPLE 5

This example illustrates that the EDTA reagent used for the extraction of the metals from spent catalysts can be recovered with high purity from the extracted solution. 100 ml of the extracted solution that contained 5.72 wt % Mo, 4.53 wt % Ni, 9.34 wt % V, 5.45 wt % Al and 10 wt % EDTA was treated with nitric acid, and the pH of the solution was adjusted to 0.1. The EDTA present in the solution was precipitated under this condition. The EDTA precipitate was filtered, washed and dried. Chemical analysis showed that it was completely free from Mo and V and contained traces of Ni (0.01 wt %) and Al (0.04 wt %). The amount of EDTA recovered was 98.7 g which shows 98.7% recovery of EDTA.

Applicant has used NiMoV/$Al_2O_3$ containing spent catalyst for metal extraction studies reported in this application. The catalyst contained negligible amounts of Co. The type and the amount of metals present in the spent hydroprocessing catalysts usual depends on the fresh catalyst composition and the feedstock used. The spent catalyst that was used for metals extraction in the present application was collected from the atmospheric residue desulfurization (ARDS) unit in Kuwait. A fresh catalysts used in the process contained NiMo/$Al_2O_3$. It contained no Co. During the hydrotreating operation, metals such as V and Ni present in the atmospheric residue feedstock were deposited on the catalyst. The spent catalysts at the end of the operation contained Ni, Mo, V and Al. Sometimes fresh catalysts containing CoMo/$Al_2O_3$ will be used in the process instead of NiMoV/$Al_2O_3$, and in such cases the spent catalyst will contain the metals Co, Mo, V, Ni and Al. When metals are extracted from such spent catalysts by leaching and subsequent solvent extraction, colbalt can be recovered using a similar procedure used for Ni recovery.

While the invention has been disclosed in connection with its preferred embodiments it should be recognized that changes and modifications may be made therein without departing from the scope of the claims.

What is claimed is:

1. A process for extraction of V, Mo, Co, Ni and Al from spent hydroprocessing catalysts comprising the following steps:
    i) washing the spent catalysts to remove residual oil and drying the spent catalyst;
    ii) grinding the spent catalysts to produce fine particles of less than or equal to 500 microns;
    iii) decoking the fine particles to remove carbonaceous deposits;
    iv) mixing the decoked fine particles with Ethylene Diamine Tetra Acetic Acid (EDTA) solution and subjecting the fine powder and EDTA to ultrasonic agitation to thereby extract V, Mo, Ni, Co, and Al; and
    v) recovery of EDTA by treating the ultrasonic agitated metals containing EDTA solution with nitric acid.

2. A process for extraction of V, Mo, Ni, Co and Al from spent hydroprocessing catalysts according to claim 1 in which the fine particles in step ii produce particle sizes of less than 500 microns.

3. A method for the selective recovery of Mo, V, Ni, Co, and Al from spent hydroprocessing catalysts according to claim 2 in which the dried catalyst is crushed and ground and sieved to produce a particle size of less than 500 microns prior to mixing with EDTA and ultrasonic vibration.

4. A process for extraction of V, Mo, Ni, Co and Al from spent hydroprocessing catalysts according to claim 1 in which the drying of the spent catalyst after washing in step i is done at a temperature between 110° to 120° C. in air or nitrogen.

5. A process for extraction of V, Mo, Ni, Co and Al from spent hydroprocessing catalysts according to claim 1 in which the EDTA solution is in the range of 5 to 15 wt % and the pH is in the range of 9 to 12.

6. A process for extraction of V, Mo, Ni, Co and Al from spent hydroprocessing catalysts according to claim 5 in which the EDTA solution is about 10 wt % and its pH is in the range of 10 to 11.

7. A process for extraction of V, Mo, Ni, Co and Al from spent hydroprocessing catalysts according to claim 1 in which the ultrasonic agitation is carried out at a temperature in the range of 35° to 70° C.

8. A process for extraction of V, Mo, Ni, Co and Al from spent hydroprocessing catalysts according to claim 7 in which the ultrasonic agitation is carried at 60° C.

9. A process for extraction of V, Mo, Ni, Co and Al from spent hydroprocessing catalysts according to claim 1 in which the ratio between spent catalysts and EDTA solution in step iv is between 1:30 and 1:50.

10. A process for extraction of V, Mo, Ni, Co and Al from spent hydroprocessing catalysts according to claim 9 in which the ratio between spent catalysts and EDTA solution 1:40.

11. A process for extraction of V, Mo, Ni, Co and Al from spent hydroprocessing catalysts according to claim 1 in which the ultrasonic agitation in step iv during the extraction of V, Mo, Ni, Co, and Al continues for a period of 3 to 8 hours.

12. A process for extraction of V, Mo, Ni, Co and Al from spent hydroprocessing catalysts according to claim 11 in which the ultrasonic agitation in step iv continues for a period of six (6) hours.

13. A process for extraction of V, Mo, Ni, Co and Al from spent hydroprocessing catalysts according to claim 1 in which EDTA used for V, Mo, Ni, Co and Al is separated and recovered with high purity from the EDTA solution by acid treatment with nitric acid with a pH of about 0.1.

14. A method for the selective recovery of Mo, V, Ni, Co and Al according to claim 1 which includes the step of decoking the oil free catalysts pursuant to the following program that involves heating the spent catalyst in an oxygen containing gas of 2-10% $O_2$ in nitrogen or air in three steps: in a first step temperature was linearly raised from 40° C. to 370° C. at 330° C/hr and kept at this temperature for one hour, in a second step the temperature was then increased from 370° C. to 450° C. at 80° C/h and stayed for one hour then in a final decoking step, done by ramping from 450° C. to 550° C. in two hours at 50° C/h and then heating at 550° C. for one hour.

15. A method for the selective recovery of Mo, V, Ni, Co and Al from spent hydroprocessing catalysts, said method comprising the steps of:
   a. providing a mass of spent hydroprocessing catalysts containing up to about 10% oil, about 10 to 30 wt % coke or carbonaceous deposits, about 3 to 10 wt % Mo, about 2 to 6 wt. % Ni, and about 3 to 20% V and about 2 to 4 wt % Co and up to about 35 wt. % Al;
   b. washing the spent catalysts to remove the residual oil and drying the spent catalysts at about 110 to 120° C. in air or nitrogen;
   c. crushing and/or grinding the dried spend catalysts to a fine powder with a particle size of less than 500 microns;
   d. mixing the fine powder with an Ethylene Diamine Tetra Acetic Acid (EDTA) and subjecting the fine powder in EDTA to ultrasonic vibration for a period of about 6 hours;
   e. filtering the fine powder in EDTA and separating the dissolved metals, V, Ni, Mo, and Co with traces of Al in solutions and while undissolved alumina remains as a residue;
   f. treating the filtrate of solution with $HNO_3$ to precipitate EDTA; and
   g. solvent extraction of the aqueous solution to obtain Mo, V, Ni, Co, and Al.

16. A method for recovery of Mo, V, Ni, Co and Al from spent hydroprocessing catalysts, said method consisting of the following steps:
   a.) providing a mass of spend hydroprocessing catalysts containing up to about 10% oil, about 10 to 30_wt % coke or carbonaceous deposits, about 3 to 10 wt % Mo, about 2 to 6_wt % Ni, about 3 to 20_wt % V, about 2-4 wt % Co and up to 35_wt % Al;
   b.) washing the spent catalysts in naphtha or toluene to remove the residual oils and drying at 110 to 120° C. in air or nitrogen;
   c.) decoking the oil free agent catalysts to remove coke, carbonaceous deposits and sulfur deposits by heating in air or in a gas containing 2-10% $O_2$ in $N_2$ at temperatures between 370 to 550° C. according to the following programmed temperature conditions in three steps: in a first step temperature was linearly raised from 40° C. to 370° C. at 330° C/hr and kept at this temperature for one hour, in a second step the temperature was then increased from 370° C. to 450° C. at 80° C/h and stayed for one hour and then a final decoking step was done by ramping from 450° C. to 550° C. in two hours at 50° C/h and then heating at 550° C. for one hour;
   d.) grinding and sieving the decoked spent catalysts to provide fine particles of less than 500 microns;
   e.) mixing the fine particles from step d. with a solution of about 10 wt % Ethylene Diamine Tetra Acetic Acid (EDTA) with a pH in the range of 9-12 and subjecting the fine particles and EDTA to ultrasonic vibration at about 60° C. to produce a solution;
   f.) filtering the solution from step e. to provide a remaining solution of Mo, V, Ni, Co, and Al and a residue of $Al_2O_3$;
   g.) treating the remaining solution from step f. with nitric acid with a pH of 0.1 to produce an aqueous solution of Mo, V, Ni, Co and Al and a residue of EDTA; and
   h.) solvent extraction of Mo, V, Ni, Co and Al.

* * * * *